US007015677B2

(12) United States Patent
Kawabata

(10) Patent No.: US 7,015,677 B2
(45) Date of Patent: Mar. 21, 2006

(54) AUTOMATIC VOLTAGE REGULATOR WITH FUNCTION FOR SUPPRESSING OVERSHOOT

(75) Inventor: Kentaro Kawabata, Saitama (JP)

(73) Assignee: Denyo Co., Ltd., Tokyo (JP)

( * ) Notice: Subject to any disclaimer, the term of this patent is extended or adjusted under 35 U.S.C. 154(b) by 120 days.

(21) Appl. No.: 10/824,564

(22) Filed: Apr. 15, 2004

(65) Prior Publication Data

US 2005/0104561 A1 May 19, 2005

(30) Foreign Application Priority Data

Nov. 13, 2003 (JP) ............................. 2003-383315

(51) Int. Cl.
H02H 7/06 (2006.01)
H02P 11/00 (2006.01)
H02P 9/00 (2006.01)
H02P 9/10 (2006.01)

(52) U.S. Cl. ............................. 322/28; 322/59; 322/44

(58) Field of Classification Search .................. 322/28, 322/24, 46, 22, 26, 59, 44; 361/18, 21, 22, 361/86; 363/97; 307/87
See application file for complete search history.

(56) References Cited

U.S. PATENT DOCUMENTS 3,619,761 A  * 11/1971 Nagae et al. ................. 322/25
3,863,137 A  * 1/1975 Mishima et al. .............. 322/25
5,428,492 A  * 6/1995 Swonger ....................... 361/18
2001/0005320 A1 * 6/2001 Ueda et al. .................... 363/95
2002/0089311 A1 * 7/2002 Shimizu et al. ............... 322/28

FOREIGN PATENT DOCUMENTS

| JP | 61161999 A | * | 1/1985 |
| JP | 05-284799 |   | 10/1993 |
| JP | 2005204440 A | * | 7/2005 |

* cited by examiner

Primary Examiner—Julio C. Gonzalez
(74) Attorney, Agent, or Firm—Squire, Sanders & Dempsey LLP

(57) ABSTRACT

An automatic voltage regulator of a generator with a function for suppressing an overshoot which regulator keeps an output voltage at a predetermined voltage by controlling exciting currents of the generator with turning a switching device on and off, and comprises a voltage detection means for detecting the output voltage of the generator; a deviation calculation means for calculating a deviation for a target with respect to a detected detection voltage; an integral-value calculation means for calculating an integral value of the deviation; and a pulse signal calculation means for calculating the pulse width based on an integral coefficient, a proportional coefficient, the deviation, and its integral value, and for outputting said pulse width as a pulse signal, wherein when before voltage establishment the detection voltage is not less than the first reference voltage, the target voltage is replaced with the set voltage; and wherein the switching device inputs the pulse signal calculated by the pulse signal calculation means.

6 Claims, 7 Drawing Sheets

AUTOMATIC VOLTAGE REGULATOR WITH FUNCTION FOR SUPPRESSING OVERSHOOT

BACKGROUND OF THE INVENTION

1. Field of the Invention

The present invention relates to an automatic voltage regulator to automatically keep an output voltage of a generator constant.

2. Description of the Related Art

Conventionally, there exists an automatic voltage regulator to keep an output voltage of a generator to be a set voltage by comparing a detection voltage with the set one of the generator by a comparator and controlling an exciting current of the generator depending on their difference, and another automatic voltage regulator as below is proposed in order to solve a weak point that the output voltage largely overshoots a rated voltage just after a start of the generator.

As shown in FIG. 7, this automatic voltage regulator 80 is equipped with a detection means 83 for detecting that a motor 81 (engine) has been stabilized to a rated speed, a preset circuit 85 for giving a comparator 84 a preset voltage lower than a set voltage based on a detection result of the detection means 83 instead of the set voltage, an exciting current supply means 86 for supplying an exciting current in response to a detection of the detection means 83, a timer 87 for detecting a lapse of constant time after the detection of the detection means 83, and a change means 88 for changing a voltage given to the comparator 84 depending on detection time of the timer 87 from the preset voltage to the set voltage (see columns [0008] to [0010] and FIG. 1 in Japanese Patent Laid-Open Publication No. Hei 5-284799).

However, although the automatic voltage regulator 80 is configured so as to perform a change from a preset voltage to a set one just after a start of the generator 82 depending on the detection time of the timer 87, the regulator 80 has a problem that it cannot surely suppress an overshoot since the preset voltage is not given depending on a detection voltage.

In addition, the regulator 80 has another problem in conditions of a load short circuit and a heavy load application (hereinafter referred to as "the load short-circuit condition and the like") that it cannot suppress an overshoot due to a release of their causes.

SUMMARY OF THE INVENTION

The present invention is performed to solve the problems described above and its exemplary object is to provide an automatic voltage regulator that can suppress an overshoot at both timings of voltage establishment after a start of a generator and return after the load short-circuit condition and the like The invention to solve the problems is an automatic voltage regulator with a function for suppressing an overshoot of the generator in order to keep an output voltage to be a set voltage set in advance by controlling an exciting current of the generator with turning a switching device on/off depending on a pulse width, and the automatic voltage regulator is equipped with a voltage detection means for detecting an output voltage of the generator; a deviation calculation means for calculating a deviation for a target voltage with respect to a detected detection voltage; an integral value calculation means for calculating an integral value of the deviation; and a pulse signal calculation means for calculating the pulse width based on an integral coefficient, a proportional coefficient, the deviation, and the integral value of the deviation and thereby outputting it as a pulse signal, and the automatic voltage regulator has characteristics as below:

Firstly, the automatic voltage regulator is configured so that when before voltage establishment the detection voltage is less than a first reference voltage lower than the set voltage, the target voltage is replaced with a second reference voltage that is not less than the first reference voltage and less than the set voltage; and when before voltage establishment the detection voltage is not less than the first reference voltage, the target voltage is replaced with the set voltage and the switching device inputs the pulse signal calculated by the pulse signal calculation means as a signal of the pulse width.

Here, as the switching device, it is suitable to use a switching-device such as a MOS-FET (Metal Oxide Semiconductor Field Effect Transistor), an IGBT (Insulated Gate Bipolar Transistor), and a thyristor (SCR)

The automatic voltage regulator of the invention with the function for suppressing the overshoot is configured so that when before voltage establishment a detection voltage is less than a first reference voltage lower than a set voltage, a target voltage is replaced with a second reference voltage that is not less than the first reference voltage and less than the set voltage, whereby the pulse width is calculated. Accordingly, since when a detection voltage before voltage establishment is small, it is possible to prevent the pulse width from becoming too large due to a deviation by replacing the target voltage with the second reference voltage lower than the set voltage thereby making a deviation value small, the automatic voltage regulator of the invention can suppress the overshoot.

In addition, secondly, the automatic voltage regulator is configured so that when after voltage establishment the generator is judged to be in a load short circuit condition or a heavy load application condition, the pulse width is fixed at all conductive condition, an integral value of the deviation is made zero, the target voltage is replaced with a third reference voltage that is not less than the detection voltage and less than the set voltage; when after voltage establishment the generator is in the load short-circuit condition or the heavy load application condition, and the detection voltage is not less than the target voltage, the target voltage is replaced so as to increase in incremental steps for every predetermined value until the target voltage reaches the set voltage; and when after voltage establishment the target voltage reaches the set voltage, the target voltage is replaced with the set voltage and the switching device inputs the pulse signal calculated by the pulse signal calculation means as a signal of the pulse width.

According to the invention, the automatic voltage regulator is configured so that when after voltage establishment the generator is judged to be in the load short-circuit condition and the like, a target voltage is replaced with a third reference voltage that is not less than the detection voltage and less than the set voltage; and when the detection voltage is not less than the target voltage, the target voltage is replaced so as to increase in incremental steps for every predetermined value until the target voltage reaches the set voltage. Accordingly, since when the generator is judged to be in the load short-circuit condition and the like, the output voltage of the generator can be slowly increased by lowering a target voltage to a value corresponding to a detection voltage and then gradually increasing a target value of the target voltage, the automatic voltage regulator can surely suppress the overshoot.

In addition, the automatic voltage regulator is configured so that since when the generator is judged to be in the load short-circuit condition and the like, the pulse width is fixed at all conductive condition and is calculated with making a deviation-integral value zero by the deviation-integral means, the automatic voltage regulator can surely prevent the overshoot even when the load short-circuit condition and the like are released since the deviation-integral value does not becomes too large and thus the pulse width is prevented from becoming too large due to the deviation-integral value.

The automatic voltage regulator with the function for suppressing the overshoot can also be configured so that when before voltage establishment the detection voltage is less than the first reference voltage, the pulse width is calculated by replacing the proportional coefficient with a modified proportional coefficient smaller than a set value and making the integral value of the deviation zero in the pulse signal calculation means in calculating the pulse signal.

According to the invention, since the automatic voltage regulator can prevent the pulse width from becoming too large due to a deviation-integral value even when a detection voltage is small for a set voltage, it can surely suppress the overshoot.

In addition, since the automatic voltage regulator sets a proportional coefficient a modified proportional coefficient smaller than a set value and calculates the pulse width using the modified proportional coefficient in question in order to rapidly converge voltage variations in load variations in steady load operation, the calculated pulse width can be narrower and an output voltage rise of a generator can be slow, whereby the automatic voltage regulator can surely suppress the overshoot.

Moreover, the automatic voltage regulator with the function for suppressing the overshoot can also be configured so that it is equipped with a differential calculation means for calculating a differential value of the deviation, wherein the pulse signal calculation means calculates the pulse width, further using a differential coefficient and the differential value of the deviation.

BRIEF DESCRIPTION OF THE DRAWINGS

FIG. 6 is a timing chart of various indexes in return from the load short-circuit condition and the like.

DESCRIPTION OF THE MOST PREFERRED EMBODIMENT

Figure 1:
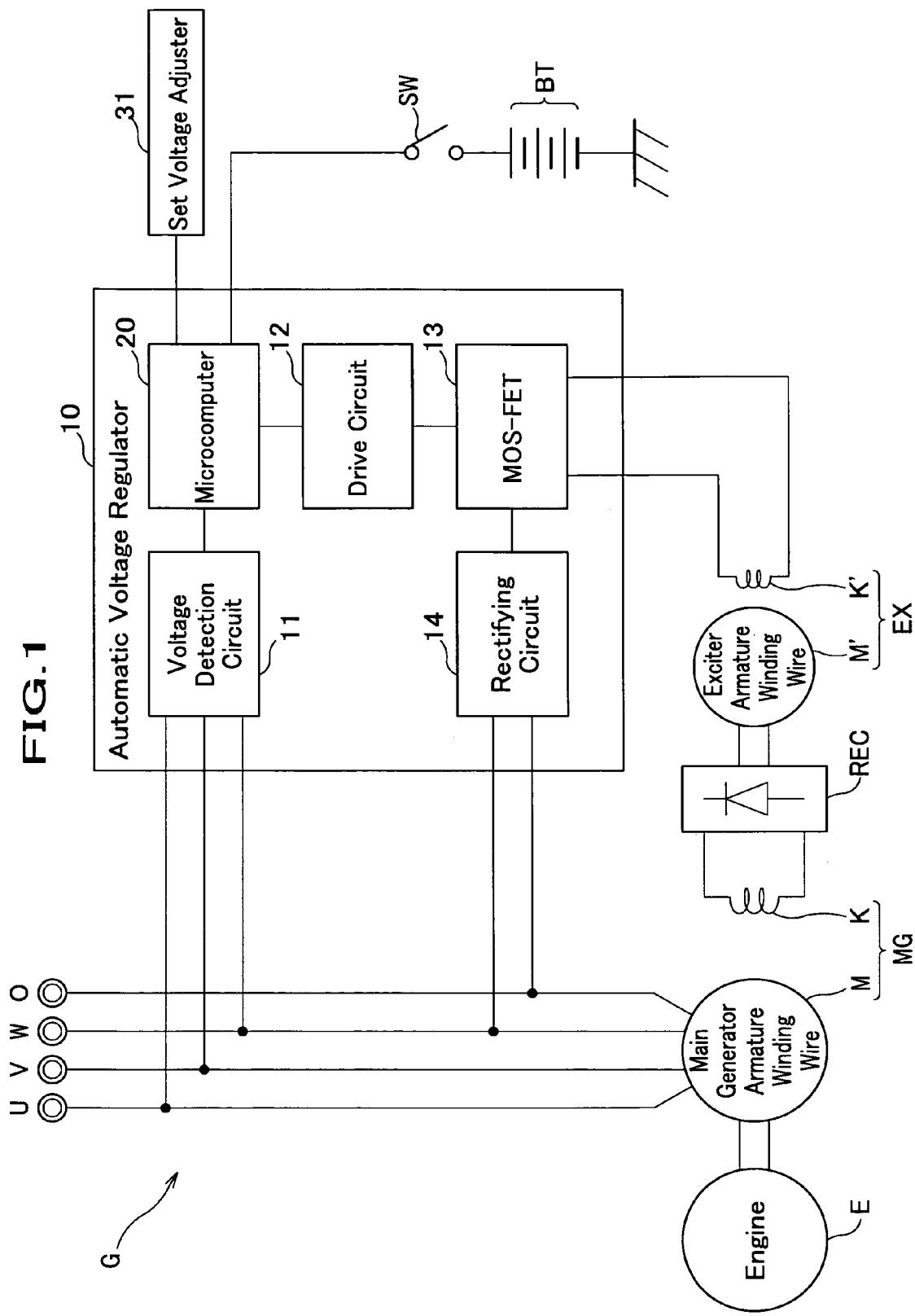
FIG. 1 is a configuration drawing of an automatic voltage regulator with a function for suppressing an overshoot in the present invention.

One of most preferred embodiments to implement the present invention (hereinafter referred to as "the embodiment") will be described in detail, referring to the drawings.

(1) Configuration

As shown in FIG. 1, a generator G equipped with an automatic voltage regulator 10 with a function for suppressing an overshoot in the invention (hereinafter referred to as "the automatic voltage regulator") is driven by an engine E, has a main generator MG with a main generator armature winding wire M and a main generator field winding wire K, and an exciter EX (alternate current exciter generator) with an exciter armature winding wire M' and an exciter field winding wire K', and is configured as a three-phase and four-wire generator consisting of the main generator armature winding wires U, V, W, and O. And the exciter armature winding wire M' is designed to be excited by exciting currents of the exciter field winding wire K' and to supply the exciting currents to the main generator field winding wire K through a rectifier REC.

The automatic voltage regulator 10 has a voltage detection circuit 11 (voltage detection means), a microcomputer 20 (hereinafter referred to as "micon"), a drive circuit 12, a MOS-FET 13, and a rectifying circuit 14. In addition, the automatic voltage regulator 10 is connected to a set voltage adjuster 31 of an up/down switch to input a prescribed set voltage value (hereinafter referred to as "set voltage data") and the set voltage data is designed to be input.

[Voltage Detection Circuit]

The voltage detection circuit 11 is a circuit to detect an output voltage of the main generator MG and a voltage proportional to a detection voltage is output to an A/D converter 21 of the micon 20.

[Micon]

Figure 2:
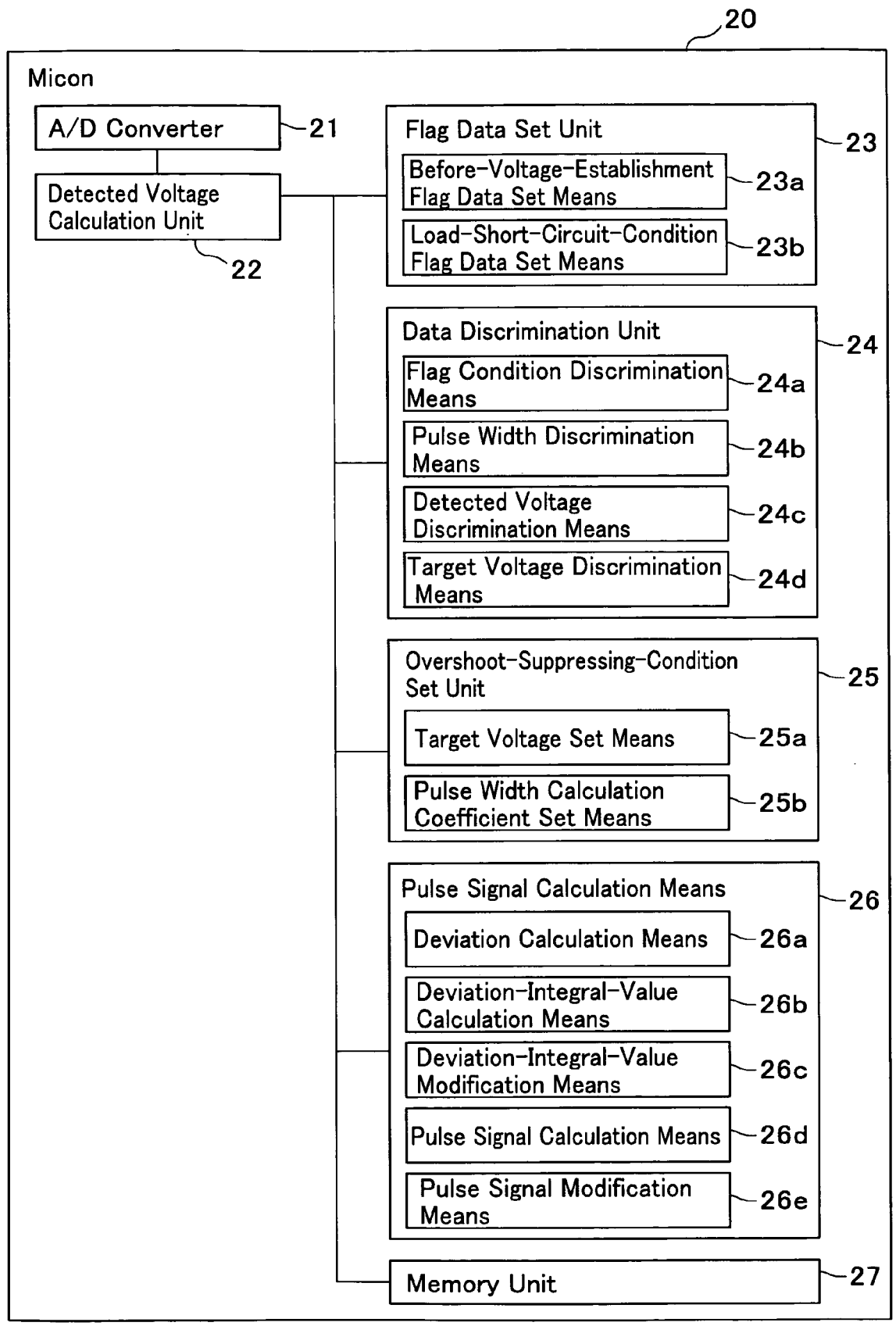
FIG. 2 is a configuration drawing of a microcomputer.

As shown in FIG. 2, the micon 20 makes its main portions of the A/D converter 21, a detected voltage calculation unit 22, a flag data set unit 23, a data discrimination unit 24, an overshoot suppressing condition set unit 25, a pulse signal calculation unit 26, and a memory unit 27. With sequentially reading programs memorized in the memory unit 27 and running them, the micon 20 plays a role of maintaining the output voltage of the main generator MG a constant set voltage set down in advance (200 V in the embodiment) by running a series of control, that is, from calculation of a pulse signal to perform on/off control of the MOS-FET 13 to its sending The A/D converter 21 is a means to convert an output voltage out of the voltage detection circuit 11 to digital values and to output them to the detected voltage calculation unit 22.

In addition, the detected voltage calculation unit 22 is a means to calculate detected voltage data by computing a root-mean-square value of the output voltage and to output the data to each unit of the micon 20.

[Flag Data Set Unit]

The flag data set unit 23 is configured of a before-voltage-establishment flag set means 23a and a load-short-circuit-condition flag set means 23b.

The before-voltage-establishment flag set means 23a is a means to set a flag before voltage establishment to discriminate conditions before voltage establishment between turning-on of a control circuit power source switch SW described later and conditions just after a start of an engine in which detection voltages are less than a set voltage, from those after voltage establishment in which detection voltages are not less than the set voltage. And depending on a detection voltage value, the means 23a is designed to set the flag to be "1" if a condition is before voltage establishment and to set the flag to be "0" if after voltage establishment.

However, when the engine E is in a stop condition after voltage establishment, the before-voltage-establishment flag is designed to be reset to "1."

In addition, the load-short-circuit-condition flag set means 23b is a means to set a load-short-circuit-condition flag to discriminate a condition in which the main generator MG is in a steady load operation condition from the load short-circuit condition and the like, and the means 23b is designed to set the flag to be "0" if the main generator is in the steady load operation condition and to set the flag to be "1" if in the load short-circuit condition and the like.

Meanwhile, the load short-circuit condition and the like are here a condition in which a pulse width all conducts (hereinafter the pulse width at that time is referred to as "all conductive pulse width") the MOS-FET 13 and an output voltage of the main generator MG is extremely lowered, and the condition results in being judged by the data discrimination unit 24.

[Data Discrimination Unit]

The data discrimination unit 24 plays a role of judging an operation condition of the main generator MG in accordance with each index and is configured of a flag condition discrimination means 24a, a pulse width discrimination means 24b, a detection voltage discrimination means 24c, and a target voltage discrimination means 24d.

The flag condition discrimination means 24a is a means to judge whether or not the main generator MG is before voltage establishment and whether or not the main generator MG is in the load short-circuit condition and the like, based on the values of the before-voltage-establishment flag and the load-short-circuit condition flag set in the flag data set unit 23.

The pulse width discrimination means 24b is a means to judge whether or not the main generator MG reaches the load short-circuit condition and the like. The means 24b is designed to judge whether or not a product of a integral coefficient Ki and a deviation-integral value (hereinafter referred to as "deviation-integral-value product number") calculated by the pulse signal calculation unit 26 described later is not less than all conductive pulse width, and to judge that the load short-circuit condition and the like are reached when the condition in question is satisfied.

The detection voltage discrimination means 24c is a means to judge whether a detection voltage is a set voltage or a target voltage.

The target voltage discrimination means 24d is a means to judge whether or not a target voltage is a set voltage.

[Overshoot Suppressing Condition Set Unit]

The overshoot suppressing condition set unit 25 is configured of a target voltage set means 25a and a pulse width calculation coefficient set means 25b.

The target voltage set means 25a is a means to set/replace a target voltage as below depending on an operation condition of the main generator MG.

The target voltage is set a set voltage before a start of the engine E. When the before-voltage-establishment flag is "1" and a detection voltage is less than a first reference voltage (70% of the set voltage in the embodiment) set in advance, a processing that replaces the target voltage with a second reference voltage (80% of the set voltage in the embodiment) set in advance is performed.

Here, a reason why the processing replacing the target voltage with the second reference voltage is performed is to make a deviation value described later smaller and thereby for the deviation value to be able to suppress an overshoot when a detection voltage before voltage establishment is small, wherein the value may be not less than the first reference voltage and less than the set voltage. In the embodiment, the value is set to be 10% higher than the set voltage as a value on a safe side for the first reference voltage.

In addition, when the before-voltage-establishment flag is "1" and the detection voltage is not less than the first reference voltage, a processing that replaces a target voltage with a set voltage is performed.

In addition, when the before-voltage-establishment flag is "0" and the main generator MG is judged to have reached the load short-circuit condition and the like, a processing that replaces the target voltage with a third reference voltage (125% of the detection voltage in the embodiment) is performed. Meanwhile, whether or not the main generator MG is in the load short-circuit condition and the like is judged by whether or not the pulse width is all conductive pulse width.

Here, a reason why the processing replacing the target voltage with the third reference voltage is performed is that the MOS-FET 13 is in no control condition of all conduction when the main generator MG is in the load short-circuit condition and the like, whereby taking differences of load variations and rotation speed of the engine E into consideration, the target voltage is designed to be 25% higher than the detection voltage as a value on a safe side for the detection voltage.

In addition, when the before-voltage-establishment flag is "0", the load-short-circuit-condition flag is "1," and the detection voltage is not less than a target voltage at a determination timing, a replacement processing is step-by-step performed by adding a step voltage (voltage of a predetermined value: 5 V in the embodiment) to the target voltage at the timing until the target value becomes not less than a set voltage Moreover, when the before-voltage-establishment flag is "0" and the target voltage reaches a set voltage, a processing that replaces the target voltage with the set voltage is performed.

Meanwhile, the first to third reference voltages, the step voltage, and the like are not restricted to the values described above and can be adequately set down, depending on a machine type of the main generator MG, a set voltage, and the like.

The pulse width calculation coefficient set means 25b is a means to set a proportional coefficient Kp to calculate a pulse width, depending on a before-voltage-establishment flag value and a detection voltage.

To be more precise, when the before-voltage-establishment flag is "1" and a detection voltage is less than a set voltage, a processing that replaces the proportional coefficient Kp with a modified proportional coefficient smaller than a initial set value (for example, several tens percent of the initial set value) is performed, and in a case other than this, a processing to set the initial set value is performed.

Meanwhile, the integral coefficient Ki and the proportional coefficient Kp have a property that the smaller their values are, the coefficients Ki and Kp are difficult to reach a target value, whereby they are set down as predetermined values in advance.

[Pulse Signal Calculation Unit]

The pulse signal calculation unit 26 is a means to calculate a pulse width by PI control and to output it as a pulse signal, and is configured of a deviation calculation means 26a, a deviation-integral-value calculation means 26b, a deviation-integral-value modification means 26c, a pulse signal calculation means 26d, and a pulse signal modification means 26e.

The deviation calculation means 26a is a means to calculate a deviation (Verr) of a detection voltage by performing a computation (equation (a)) subtracting a detection voltage from a target voltage:

$$\text{Verr}(n) = \text{target voltage }(n) - \text{detection voltage }(n), \quad \text{(eq. (a))}$$

where n means a detection timing.

The deviation-integral-value calculation means 26b is a means to calculate an integral value of a calculated deviation (hereinafter referred to as "deviation-integral value") (equation (b)):

$$\Sigma_n \text{Verr}(n) = \Sigma_n \text{Verr}(n-1) + \text{Verr}(n). \quad \text{(eq. (b))}$$

The deviation-integral-value modification means 26c is a means to modify a deviation-integral value to zero in a case of a predetermined condition (case: the before-voltage-establishment flag is "1" and a detection voltage is not less than the first reference voltage, or the before-voltage-establishment flag is "0" and the load short-circuit condition and the like are reached (the load-short-circuit condition flag is "0" and the pulse width is discriminated to be all conductive pulse width).

The pulse signal calculation means 26d is a means to calculate a pulse width (T) by performing a computation of equation (c) with using a deviation and a deviation-integral value calculated by both of the deviation calculation means 26a and the deviation-integral-value calculation means 26b, or a modification value (zero) calculated by the deviation-integral-value modification means 26c, and to output the pulse width to the drive circuit 12 as a pulse signal, wherein the equation (c) is:

$$T = Kp \times \text{Verr}(n) + Ki \times \Sigma_n \text{Verr}(n). \quad \text{(eq. (c))}$$

The pulse signal modification means 26e is a means to fix the pulse width at all conductive pulse width and to output it to the drive circuit 12 as a pulse signal (hereinafter referred to as "all conductive pulse signal") when the pulse width is discriminated to be all conductive by the pulse width discrimination means 24b.

Meanwhile, a control power source of the micon 20 is connected to a battery BT through the control circuit power source switch SW (see FIG. 1).

[Drive Circuit]

The drive circuit 12 is a circuit to amplify pulse signals from the micon 20 and send them to the MOS-FET 13 as FET gate signals.

[MOS-FET]

The MOS-FET 13 is connected to the exciter field winding wire K', and to output terminals W-O of the main generator MG through the rectifying circuit 14, whereby exciting currents taken from the output terminals W-O are designed to be supplied to the exciter field winding wire K' by FET gate signals from the drive circuit 12.

Thus, the exciter EX generates electric power and the output is supplied to the main generator field winding wire K as field currents, whereby a voltage of the main generator MG is output and a gate of the MOS-FET 13 is controlled by the micon 20, and thus the output voltage of the main generator MG is designed to be maintained at a set voltage.

(2) Operation

Hereinafter operation of the automatic voltage regulator 10 of the invention will be described, referring to the drawings.

Figure 3:
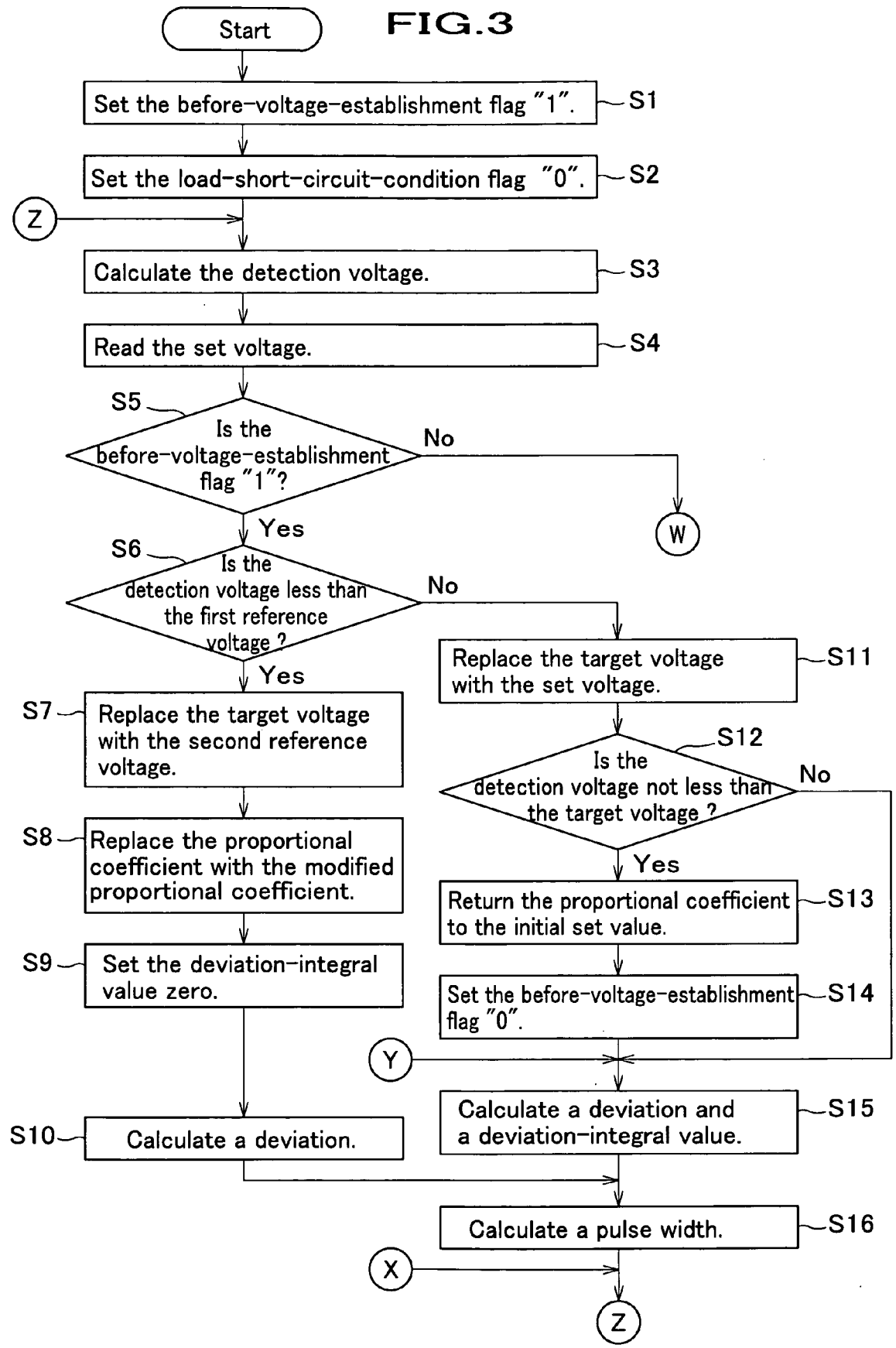
FIG. 3 is a flowchart showing operation of an automatic voltage regulator with a function for suppressing an overshoot in voltage establishment just after a start of a generator in the invention.
Figure 5:
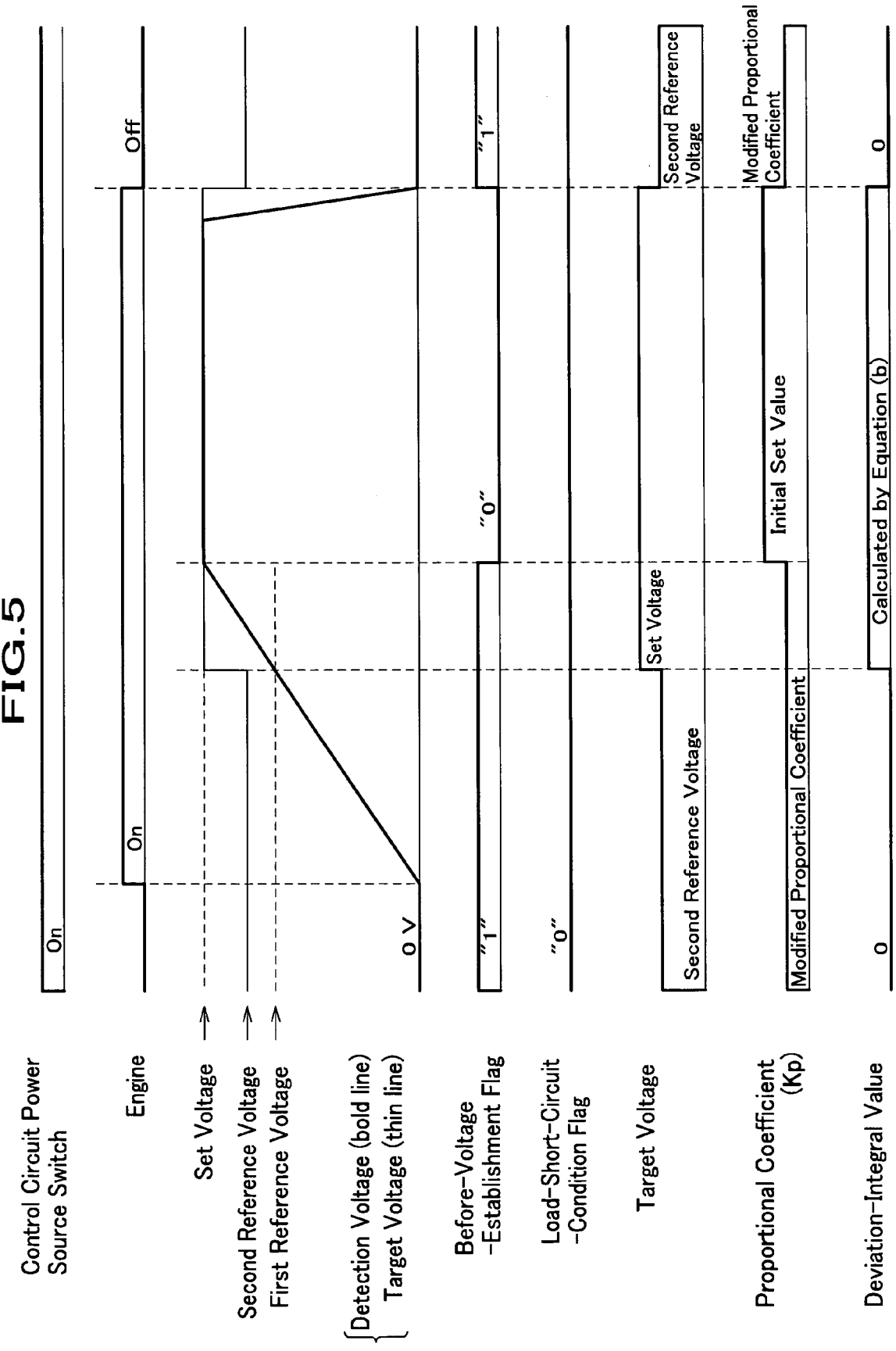
FIG. 5 is a timing chart of various indexes in voltage establishment just after a start of a generator.

[In Case of Voltage Establishment just after Start of Generator (FIGS. 3 and 5)]

When the control circuit power source switch SW is turned on, a voltage is supplied from the battery BT to the automatic voltage regulator 10. Then, the engine E is started by operation of an engine key (not shown). Since at this timing it is before voltage establishment, the before-voltage-establishment flag is set to "1" by the before-voltage-establishment flag set means 23a of the flag data set unit 23 (S1), and the load-short-circuit-condition flag is set to "0" by the load-short-circuit-condition flag set means 23b (S2).

Instantaneous values of output voltages of the main generator MG are sequentially detected at the detected voltage calculation unit 22, a detection voltage is calculated as a root-mean-square value (S3), and a set voltage set by the set voltage adjuster 31 is read (S4).

The before-voltage-establishment flag is judged to be "1" by the flag condition discrimination means 24a (Yes in S5), and subsequently, it is judged whether or not a detection voltage is less than a first reference voltage.

Then, when the detection voltage is less than the first reference voltage (Yes in S6), a target voltage is replaced with a second reference voltage by the target voltage set means 25a (S7), the proportional coefficient Kp is replaced with a modified proportional coefficient by the pulse width calculation coefficient set means 25b (S8), and a deviation-integral value is made zero by the deviation-integral-value modification means 26c (S9).

Then, from a deviation value calculated by the deviation calculation means 26a (S10) and the deviation-integral value modified to zero, a pulse width is calculated by the pulse signal calculation means 26d (S16) and is output to the MOS-FET 13 as an FET gate signal (pulse signal) through the drive circuit 12, whereby an output voltage of the main generator MG is controlled.

Thus, according to the invention, when the detection voltage before voltage establishment is small, the automatic voltage regulator 10 judges whether or not the detection voltage is less than the first reference voltage that is lower than a set voltage, and when the detection voltage is less than the first reference voltage, the automatic voltage regulator 10 replaces the target voltage with the second reference voltage that is not less than the first reference voltage, thereby a deviation value being made small, and thus the automatic voltage regulator 10 can prevent the pulse width from becoming too large due to the deviation.

In addition, since when the detection voltage is small for the set voltage, the automatic voltage regulator 10 calculates the pulse width with modifying the deviation-integral value to zero and thereby can prevent the pulse width from becoming too large due to the deviation-integral value, it can suppress the overshoot.

Moreover, since the automatic voltage regulator 10 calculates the pulse width by replacing the proportional coefficient Kp with the modified proportional coefficient smaller than the initial value, thereby the calculated pulse width becoming smaller and a rise of output voltage of the main generator MG being able to be made slow, the automatic voltage regulator 10 can suppress the overshoot.

After then, when the detection voltage becomes not less than the first reference voltage (No in S6), the target voltage is replaced with the set voltage by the target voltage set means 25a (S11). And when the detection voltage is less than the first reference voltage (No in S12), using a deviation and a deviation-integral value calculated by the deviation calculation means 26a and the deviation-integral-value calculation means 26b (S15), the pulse width is calculated by the pulse signal calculation means 26d (S16) and is output to the MOS-FET 13 through the drive circuit 12.

Meanwhile, in this case the proportional coefficient Kp is in a condition replaced with the modified proportional coefficient.

On the other hand, since when the detection voltage is not less than the target voltage (Yes in S12), the voltage becomes an established condition, the proportional coefficient Kp is returned to the initial set value by the pulse width calculation coefficient set means 25b (S13) and the before-voltage-establishment flag is set to "0", by the before-voltage-establishment flag set means 23a because of the voltage establishment (S14).

Then, using a deviation and a deviation-integral value calculated by the deviation calculation means 26a and the deviation-integral-value calculation means 26b (S15), the pulse width is calculated by the pulse signal calculation means 26d (S16) and is output to the MOS-FET 13 as an FET gate signal (pulse signal) through the drive circuit 12, whereby the output voltage of the main generator MG is controlled.

Figure 4:
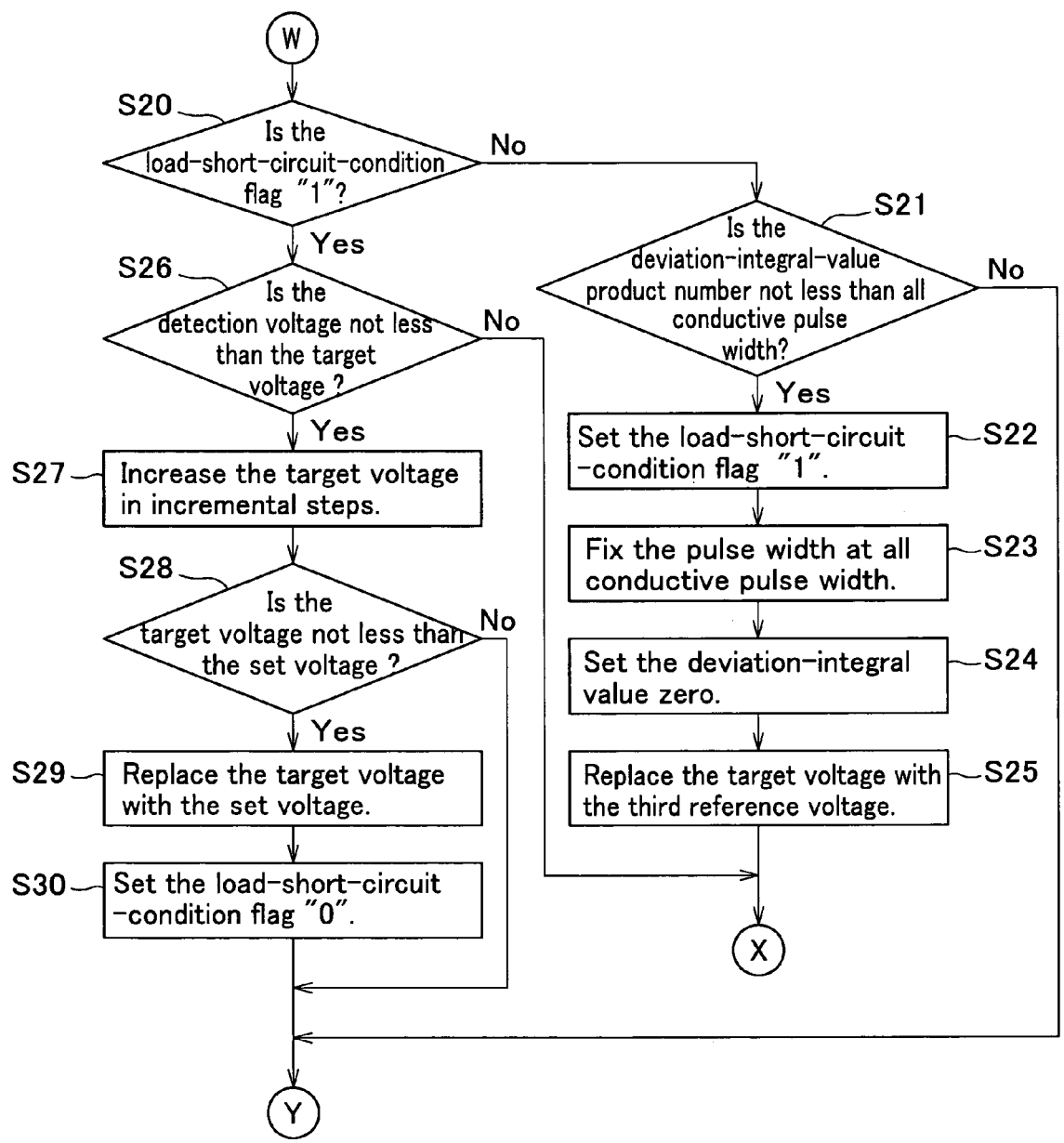
FIG. 4 is a flowchart showing operation of an automatic voltage regulator with a function for suppressing an overshoot in return from the load short-circuit condition and the like in the invention.

Moreover, when the main generator MG performs steady load operation, the load-short-circuit-condition flag is judged to be "0", (No in S20 of FIG. 4), and subsequently, it is judged whether or not a deviation-integral-value product number is not less than all conductive pulse width by the pulse width discrimination means 24b. Then, since the main generator MG does not becomes the load short-circuit condition and the like, and the deviation-integral-value product number is judged to be less than all conductive pulse width (No in S21), the main generator MG continues operation in this condition and the output voltage is maintained at the set voltage.

Figure 6:
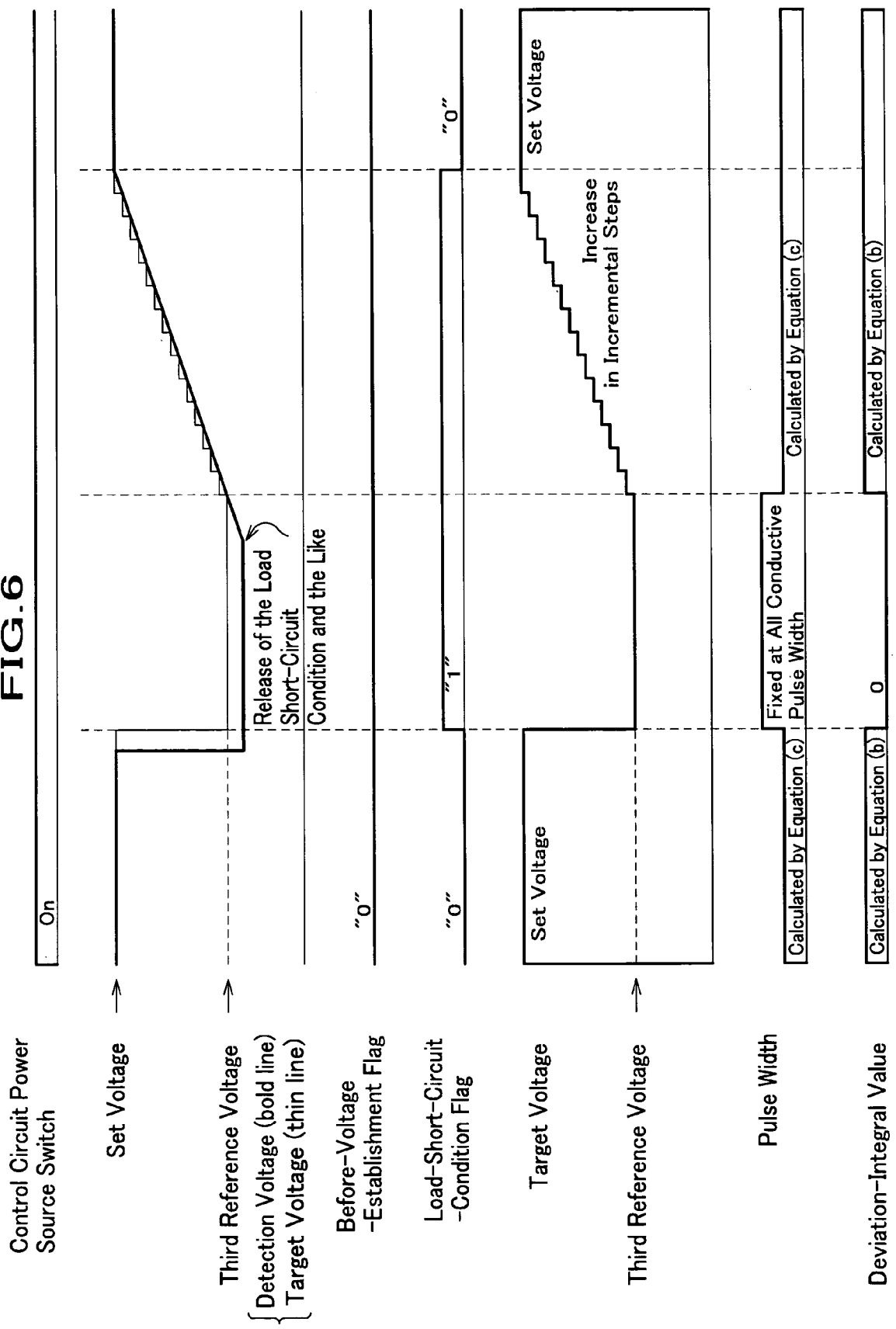
Figure 7:
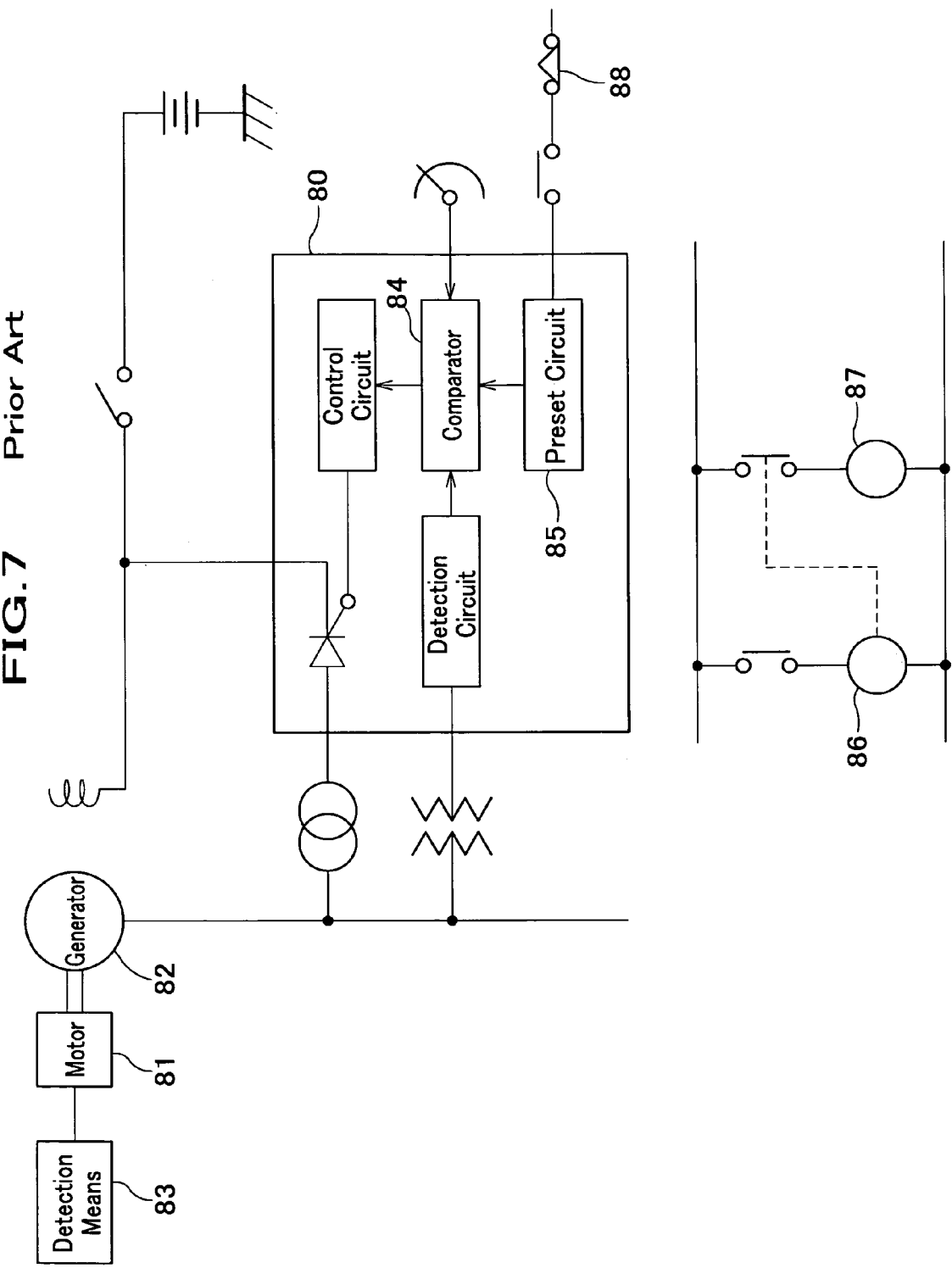
FIG. 7 is a configuration drawing of a conventional automatic voltage regulator.

[In Case of Return from Load Short-Circuit Condition and the Like (FIGS. 4 and 6)]

When a load short circuit and a heavy load are turned on after voltage establishment, the main generator MG is judged to be in the load short-circuit condition and the like (case that a deviation-integral-value product number is not less than all conductive pulse width) (Yes in S21) by the pulse width discrimination means 24b, and the load-short-circuit-condition flag is set to "1" by the load-short-circuit-condition flag set means 23b (S22). Then, since it is necessary to continue supplying short-circuit currents in order to shut off a breaker and the like, a pulse width is fixed at all conductive pulse width by the pulse signal modification means 26e (S23). And the deviation-integral value is set to zero by the deviation-integral-value modification means 26c (S24) and the target voltage is replaced with the third reference voltage by the target voltage set means 25a (S25).

Moreover, when in this condition (the load-short-circuit-condition flag: "1") the main generator MG is continued to operate (No in S5 and Yes in S20), it is judged whether or not a detection voltage is not less than the target voltage by the detection voltage discrimination means 24c, and when the detection voltage is less than the target voltage (No in S26), operation is performed as the load short-circuit condition and the like stand.

After then, when the load short-circuit condition and the like are released and the detection voltage becomes not less than the target voltage (Yes in S26), a value of the target voltage is replaced so as to increase in incremental steps by adding a step voltage to the target voltage at that timing by the target voltage set means 25a (S27). When the target voltage is less than a set voltage (No in S28), with using a deviation and a deviation value calculated by the deviation calculation means 26a and the deviation-integral-value calculation means 26b (S15), the pulse width is calculated by the pulse signal calculation means 26d (S16) and is output to the MOS-FET 13 as an FET gate signal (pulse signal) through the drive circuit 12, whereby the output voltage of the main generator MG is controlled.

On the other hand, when the detection voltage becomes not less than the target voltage (Yes in S28), the target voltage is replaced with the set voltage by the target voltage set means 25a (S29), and after the load-short-circuit-condition flag is set to "0", by the load-short-circuit-condition flag set means 23b (S30), with using a deviation and a deviation value calculated by the deviation calculation means 26a and the deviation-integral-value calculation means 26b (S15), the pulse width is calculated by the pulse signal calculation means 26d (S16) and is output to the MOS-FET 13 as an FET gate signal (pulse signal) through the drive circuit 12, whereby the output voltage of the main generator MG is controlled.

Thus, according to the invention, when the main generator MG is judged to be in the load short-circuit condition and the like, the target voltage is replaced with the third reference voltage that is not less than the detection voltage in the load short-circuit condition and the like and is less than a set voltage; and when the detection voltage is not less than the target voltage, the target voltage is replaced so as to increase in incremental steps for every predetermined value until it reaches the set voltage. Accordingly, an overshoot can be suppressed by lowering the target voltage to a value corresponding to the detection voltage when the main generator MG is judged to be in the load short-circuit condition and the like; and by gradually increasing the target voltage with slowly increasing the output voltage of the main generator MG when the load short-circuit condition and the like are released.

In addition, since when the main generator MG is judged to be in the load short-circuit condition and the like after voltage establishment, the pulse width is fixed at all conductive pulse width by the pulse signal modification means 26e and is calculated by the deviation-integral-value modification means 26c for making the deviation-integral value zero, an overshoot can be suppressed without the deviation-integral value becoming too large, thanks to the pulse width being able to be prevented from becoming too large due to the deviation-integral value even when the load short-circuit condition and the like are released.

Thus, although one of preferred embodiments of the present invention is described, the invention is not limited to such the embodiment and design can be changed without departing from the spirit and scope of the invention as needed. In particular, the automatic voltage regulator of the invention is applicable to various generators not limited to an engine-drive generator.

In addition, the embodiment has described a case that a switching device is controlled by PI control. However, it goes without saying that a MOS-FET may be configured so as to be controlled by PID control, with the pulse signal calculation unit being equipped with a differential value calculation means to calculate a deviation-differential value (Verr (n)) by equation (d) and with a pulse signal calculation means for calculating a pulse width signal T', wherein the equations (d) and (e) are:

$$\Delta Verr(n)=Verr(n-1)-Verr(n), \quad \text{(eq. (d))}$$

and $$T'=Kp \times Verr(n)+Ki \times \Sigma_n Verr(n)+Kd \times \Delta Verr(n), \quad \text{(eq. (e))}$$

where Kd is a predetermined differential coefficient.

Although in the embodiment an up/down switch is used as the set voltage adjuster 31, an adjusting trimmer may also be used, and in that case, it is necessary to convert analog values to digital ones by an A/D converter and to input them to the micon 20.

In addition, although the detected voltage calculation unit 22 is configured so as to perform controlling by the micon 20, it may be configured so that the unit 22 is made a circuit using hardware and thereby performs inputting to the A/D converter 21 of the micon 20.

Moreover, although the detection of the output voltage of the main generator MG is performed by calculating a root-mean-square value, it may also be performed by calculating an average value instead of the root-mean-square value.

Still moreover, although the MOS-FET 13 is connected to the output terminals W-O of the main generator MG through the rectifying circuit 14, other supply systems supplying exciting currents to an exciter generator field winding wire are also available.

What is claimed is:

1. An automatic voltage regulator of a generator which regulator keeps an output voltage at a predetermined voltage by controlling exciting currents of said generator with turning a switching device on and off depending on a pulse width, the regulator comprising:
   a voltage detection means for detecting the output voltage of said generator;
   a deviation calculation means for calculating a deviation for a target voltage with respect to a detected detection voltage;
   an integral-value calculation means for calculating an integral value of said deviation;
   a pulse signal calculation means for calculating said pulse width based on an integral coefficient, a proportional coefficient, said deviation, and the integral value of said deviation, and for outputting said pulse width as a pulse signal; and
   a function for suppressing an overshoot,
   wherein when before voltage establishment said detection voltage is less than a first reference voltage lower than said set voltage, said target voltage is replaced with a second reference voltage that is not less than said first reference voltage and less than said set voltage;
   wherein when before voltage establishment said detection voltage is not less than said first reference voltage, said target voltage is replaced with said set voltage; and
   wherein said switching device inputs said pulse signal calculated by said pulse signal calculation means as a signal of said pulse width.

2. An automatic voltage regulator of a generator with a function for suppressing an overshoot according to claim 1, wherein when before voltage establishment said detection voltage is less than said first reference voltage, said pulse signal calculation means replaces said proportional coefficient with a modified proportional coefficient substantially smaller than a set value and calculates said pulse width by making said deviation zero.

3. An automatic voltage regulator of a generator which regulator keeps an output voltage at a predetermined voltage by controlling exciting currents of said generator with turning a switching device on and off depending on a pulse width, the regulator comprising:
   a voltage detection means for detecting the output voltage of said generator;
   a deviation calculation means for calculating a deviation for a target voltage with respect to a detected detection voltage;
   an integral-value calculation means for calculating an integral value of said deviation;
   a pulse signal calculation means for calculating said pulse width based on an integral coefficient, a proportional coefficient, said deviation, and the integral value of said deviation, and for outputting said pulse width as a pulse signal; and
   a function for suppressing an overshoot,
   wherein when after voltage establishment the generator is judged to be in a load short-circuit condition and a heavy load application condition, said pulse width is fixed at all conductive condition, the integral value of said deviation is made zero by said integral value calculation means, and said target voltage is replaced with a third reference voltage that is not less than said detection voltage and less than said set voltage;
   wherein when after voltage establishment the generator is in a load short-circuit condition and a heavy load application condition and said detection voltage is not less than said target voltage, said target voltage is replaced so as to increase in incremental steps for every predetermined value until said target voltage reaches said set voltage;
   wherein when after voltage establishment said target voltage reaches said set voltage, said target voltage is replaced with said set voltage; and
   wherein said switching device inputs said pulse signal calculated by said pulse signal calculation means as a signal of said pulse width.

4. An automatic voltage regulator of a generator which regulator keeps an output voltage at a predetermined voltage by controlling exciting currents of said generator with turning a switching device on and off depending on a pulse width, the regulator comprising:
   a voltage detection means for detecting the output voltage of said generator;
   a deviation calculation means for calculating a deviation for a target voltage with respect to a detected detection voltage;
   an integral-value calculation means for calculating an integral value of said deviation;
   a pulse signal calculation means for calculating said pulse width based on an integral coefficient, a proportional coefficient, said deviation, and the integral value of said deviation, and for outputting said pulse width as a pulse signal; and
   a function for suppressing an overshoot,
   wherein when before voltage establishment said detection voltage is less than a first reference voltage lower than said set voltage, said target voltage is replaced with a second reference voltage that is not less than said first reference voltage and less than said set voltage;

wherein when before voltage establishment said detection voltage is not less than said first reference voltage, said target voltage is replaced with said set voltage;

wherein when after voltage establishment the generator is judged to be in a load short-circuit condition and a heavy load application condition, said pulse width is fixed at all conductive condition, the integral value of said deviation is made zero by said integral value calculation means, and said target voltage is replaced with a third reference voltage that is not less than said detection voltage and less than said set voltage;

wherein when after voltage establishment the generator is in a load short-circuit condition and a heavy load application condition and said detection voltage is not less than said target voltage, said target voltage is replaced so as to increase in incremental steps for every predetermined value until said target voltage reaches said set voltage;

wherein when after voltage establishment said target voltage reaches said set voltage, said target voltage is replaced with said set voltage; and wherein said switching device inputs said pulse signal calculated by said pulse signal calculation means as a signal of said pulse width.

5. An automatic voltage regulator of a generator with a function for suppressing an overshoot according to claim 4, wherein when before voltage establishment said detection voltage is less than said first reference voltage, said pulse signal calculation means replaces said proportional coefficient with a modified proportional coefficient substantially smaller than a set value and calculates said pulse width by making said deviation zero.

6. An automatic voltage regulator of a generator with a function for suppressing an overshoot according to any one of claims 1 to 5 which regulator comprises a differential value calculation means for calculating a differential value of said deviation, wherein said pulse signal calculation means further calculates said pulse width using a differential coefficient and the differential value of said deviation.

* * * * *